United States Patent
Oowaki et al.

(10) Patent No.: US 10,632,570 B2
(45) Date of Patent: Apr. 28, 2020

(54) LASER WELDING QUALITY DETERMINATION METHOD AND APPARATUS

(75) Inventors: Katsura Oowaki, Yokohama (JP); Shuichi Fujita, Yokohama (JP); Shinichi Ebina, Yokohama (JP); Fumio Matsuzaka, Yokohama (JP)

(73) Assignee: IHI INSPECTION & INSTRUMENTATION CO. LTD., Tokyo (JP)

( * ) Notice: Subject to any disclaimer, the term of this patent is extended or adjusted under 35 U.S.C. 154(b) by 1828 days.

(21) Appl. No.: 13/392,458

(22) PCT Filed: Aug. 26, 2010

(86) PCT No.: PCT/JP2010/064499
§ 371 (c)(1),
(2), (4) Date: Feb. 24, 2012

(87) PCT Pub. No.: WO2011/024904
PCT Pub. Date: Mar. 3, 2011

(65) Prior Publication Data
US 2012/0152916 A1    Jun. 21, 2012

(30) Foreign Application Priority Data
Aug. 27, 2009    (JP) .................. 2009-196645

(51) Int. Cl.
*B23K 26/02*    (2014.01)
*B23K 26/24*    (2014.01)
(Continued)

(52) U.S. Cl.
CPC .............. *B23K 31/12* (2013.01); *B23K 26/03* (2013.01)

(58) Field of Classification Search
CPC .... B23K 26/02–032; B23K 26/24–302; B23K 26/32–324; G05B 2219/45138
See application file for complete search history.

(56) References Cited

U.S. PATENT DOCUMENTS

| | | | |
|---|---|---|---|
| 3,808,439 A * | 4/1974 | Renius ................ | G01N 25/72 250/334 |
| 4,214,164 A * | 7/1980 | Traub ................... | B23K 11/25 219/109 |

(Continued)

FOREIGN PATENT DOCUMENTS

| | | | | |
|---|---|---|---|---|
| DE | 4106008 A1 * | 8/1992 | ........... | B23K 26/032 |
| JP | 417987 A | 1/1992 | | |

(Continued)

OTHER PUBLICATIONS

Machine Translation of JPO publication JP,2006-082129,A retrieved May 4, 2015 from the JPO web site.*

*Primary Examiner* — Michael A Laflame, Jr.
(74) *Attorney, Agent, or Firm* — Volpe and Koenig, P.C.

(57) ABSTRACT

Welding quality of a welding section W welded by laser welding is determined by acquiring an image of the welding section W and its surrounding region by means of a high-speed camera 11, analyzing, as parameters, the number of spatters P per unit length and the area of a high-luminance region in the acquired image by means of an analyzer 12, and comparing the analyzed parameters with respective comparison tables created beforehand, to determine the welding quality of the welding section Wa. Information on the welding quality of the welding section W is displayed on a monitor 13. Not only the laser welding quality of the welding section can be determined but also in-process shearing strength prediction as well as in-process fracture (Continued)

mode prediction can be performed, thus enabling quality control matching high-speed and high-precision laser welding.

4 Claims, 13 Drawing Sheets

(51) Int. Cl.
   *B23K 26/32* (2014.01)
   *B23K 31/12* (2006.01)
   *B23K 26/03* (2006.01)

(56) References Cited

U.S. PATENT DOCUMENTS

| | | | | |
|---|---|---|---|---|
| 4,647,220 A | * | 3/1987 | Adams | G01N 25/72 374/5 |
| 4,663,513 A | * | 5/1987 | Webber | B23K 26/034 219/121.6 |
| 4,904,842 A | * | 2/1990 | Yasuda | B23K 35/226 219/137 R |
| 5,963,662 A | * | 10/1999 | Vachtsevanos | G01N 21/88 250/332 |
| 6,204,469 B1 | * | 3/2001 | Fields et al. | 219/121.6 |
| 6,713,712 B1 | * | 3/2004 | Wildmann | B23K 33/00 219/121.63 |
| 2002/0134817 A1 | * | 9/2002 | Shepard | G01N 25/72 228/105 |
| 2003/0180973 A1 | * | 9/2003 | Lehman | B24B 37/013 438/14 |
| 2004/0026381 A1 | * | 2/2004 | Tsukamoto | B23K 26/06 219/121.6 |
| 2004/0249495 A1 | * | 12/2004 | Orozco et al. | 700/166 |
| 2005/0194535 A1 | * | 9/2005 | Noji | G06T 7/001 250/311 |
| 2009/0134131 A1 | * | 5/2009 | Lee et al. | 219/121.64 |
| 2009/0139968 A1 | * | 6/2009 | Hesse | B23K 26/04 219/121.63 |
| 2011/0174784 A1 | * | 7/2011 | Kamei | 219/74 |
| 2016/0139593 A1 | * | 5/2016 | Willett | B23K 26/032 700/109 |

FOREIGN PATENT DOCUMENTS

| | | |
|---|---|---|
| JP | 417991 A | 1/1992 |
| JP | 5329669 A | 12/1993 |
| JP | 11179578 A | 7/1999 |
| JP | 2000210781 A | 8/2000 |
| JP | 200319584 A | 1/2003 |
| JP | 200682129 A | 3/2006 |

* cited by examiner

LASER WELDING QUALITY DETERMINATION METHOD AND APPARATUS

TECHNICAL FIELD

The present invention relates to laser welding quality determination method and apparatus used to determine whether the quality of a welding section is good or not while laser welding is performed on metal plates, for example, zinc-coated steel plates.

BACKGROUND ART

As conventional apparatus for determining the laser welding quality of a welding section, there has been known a molten pool visualization apparatus disclosed in Patent Document 1, for example.

The molten pool visualization apparatus is equipped with a light source, a camera, and a wavelength filter. The light source emits high-luminance short-pulse laser light onto a molten pool created during laser welding. The camera has a high-speed shutter and acquires an image of the molten pool and its surrounding region. The wavelength filter is attached to the camera and transmits only the wavelength of the short-pulse laser light therethrough.

In the molten pool visualization apparatus, the light source irradiates the molten pool with the short-pulse laser light having higher luminance than plasma light or laser scattered light. The camera of the molten pool visualization apparatus is configured to open and close the high-speed shutter at intervals synchronized with the intervals at which the emission of the short-pulse laser light from the light source is started and stopped. When the high-speed shutter is opened in synchronism with the emission of the short-pulse laser light from the light source, the molten pool is photographed. At this time, the plasma light and the laser scattered light are attenuated by the wavelength filter, so that the molten pool can be observed on the monitor.

PRIOR ART LITERATURE

Patent Document

Patent Document 1: Japanese Laid-open Patent Publication No. 11-179578

SUMMARY OF THE INVENTION

Problems to be Solved by the Invention

In recent years, the laser welding technology has advanced to such an extent that the laser welding can be performed at high speed and with high precision. As a result of the technological advance, there has been a demand for an inspection method that enables quick and accurate inspection of the state of welding to determine the quality of the welding section.

The aforementioned conventional molten pool visualization apparatus is capable of visualizing the molten pool, but since the molten pool is photographed frame by frame, the molten pool can be observed only after the welding is finished. Namely, the welding quality cannot be determined quickly. In addition, with the conventional molten pool visualization apparatus, the state of welding alone can be observed, and it is difficult to diagnose welding defects and predict shearing strength and fracture mode. A solution to the problems has therefore been awaited.

The present invention was created in view of the above circumstances, and an object thereof is to provide laser welding quality determination method and apparatus which not only permit the laser welding quality of a welding section to be determined but also enable in-process shearing strength prediction as well as in-process fracture mode prediction, thus making it possible to perform quality control matching high-speed high-precision laser welding.

Summary

The method according to the present invention is suited for determination of the welding quality of a welding section subjected to laser welding using laser light from a CO2 laser or YAG laser, wherein an image of the welding section and a region surrounding the welding section is acquired by using a high-speed camera, a parameter such as a spatter count per unit length, an area of a high-luminance region or a keyhole detection frequency in the acquired image is analyzed, welding quality of the welding section is determined by comparing the analyzed parameter with a comparison table created beforehand, and a result of the welding quality determination is displayed on a monitor.

The laser welding quality determination method of the present invention is applied to determination of laser welding quality of a welding section of steel plates stacked one upon another, and the spatter count per unit length and the area of the high-luminance region in the acquired image are analyzed as parameters. If the spatter count per unit length is greater than a reference value indicated by a comparison table created beforehand, it is judged that pits are formed due to an excessively small gap between the steel plates, and if a variance value of the area of the high-luminance region is greater than a reference value indicated by a comparison table created beforehand, it is judged that burn-through is caused due to an excessively large gap between the steel plates. The laser welding quality is judged to be good if the spatter count per unit length and the variance value of the area of the high-luminance region are both smaller than or equal to the respective reference values indicated by the corresponding comparison tables. A result of the welding quality determination is displayed on the monitor.

Preferably, a detection frequency of keyholes in the acquired image is analyzed as a parameter. If the detection frequency of keyholes is higher than or equal to a reference frequency indicated by a comparison table created beforehand, it is judged that the welding quality is good, and if the detection frequency of keyholes is lower than the reference frequency indicated by the comparison table, it is judged that the welding quality is poor. A result of the welding quality determination is displayed on the monitor.

The method is preferably applied to determination of laser welding quality of a welding section of zinc-coated steel plates stacked one upon another, and an amount of fume in the acquired image is analyzed as a parameter. If the amount of fume is smaller than or equal to a reference value indicated by a comparison table created beforehand, it is judged that the welding quality is good, and if the amount of fume is larger than the reference value indicated by the comparison table, it is judged that the welding quality is poor. A result of the welding quality determination is displayed on the monitor.

Further, the present invention provides an apparatus for determining laser welding quality of a welding section of, for example, steel plates stacked one upon the other, the laser welding being performed using laser light from a CO2 laser or YAG laser. The laser welding quality determination apparatus comprises: a high-speed camera configured to acquire an image of the welding section and a region surrounding the welding section; an analyzer configured to analyze a parameter in the acquired image and determine welding quality of the welding section; and a monitor configured to display information on the welding quality of the welding section determined by the analyzer.

In the laser welding quality determination method and apparatus of the present invention, where the spatter count per unit length is used as an analyzing parameter, a comparison table is prepared on the basis of the correlation between the spatter count and the occurrence rate of welding defects, and a reference value for determining the welding quality is set in the comparison table. The reference value is determined in accordance with the level of required quality.

Similarly, where the variance value of the area of a high-luminance region is used as an analyzing parameter, a comparison table is prepared on the basis of the correlation between the variance value of the area of a high-luminance region and the welding defect occurrence rate, and a reference value for determining the welding quality is set in the comparison table. On the other hand, where the detection frequency of keyholes is used as an analyzing parameter, a comparison table is prepared on the basis of the correlation between the keyhole detection frequency and the welding defect occurrence rate, and a reference frequency for determining the welding quality is set in the comparison table. The reference frequency is also determined in accordance with the level of required quality.

In the case of determining the laser welding quality of a welding section of zinc-coated steel plates stacked one upon the other, the amount of fume generated as a result of the fusion of the zinc coating may be used as a parameter. In this case, a comparison table is prepared on the basis of the correlation between the amount of fume and the welding defect occurrence rate, and a reference value for determining the welding quality is set in the comparison table. This reference value is also determined in accordance with the level of required quality.

Where the laser welding quality determination method and apparatus of the present invention are applied to welding of steel plates stacked one upon the other, it is desirable that the spatter count and the variance value of the area of a high-luminance region, which are linearly correlated with the defect occurrence rate and with which the defect occurrence rate can be easily estimated, should be used as analyzing parameters.

When zinc-coated steel plates stacked one upon the other are welded together, for example, a defect attributable to zinc vapor, such as pits, is caused because the weld metal is blown off by the zinc vapor. The weld metal thus blown off presumably forms spatters. Thus, also from the viewpoint that it is easy to correlate spatters with a defect generation phenomenon, the spatter count is preferably used as an analyzing parameter.

The laser welding quality determination method and apparatus of the present invention can be applied not only to ordinary laser welding but to laser remote welding and laser arc hybrid welding. The laser remote welding is welding wherein a laser using an optical system such as a galvanometer mirror and having a long focal length is moved at high speed.

There are no particular restrictions on the installation position of the high-speed camera for acquiring an image of the welding section and its surrounding region. Where the present invention is applied to laser remote welding, the high-speed camera is preferably positioned so as to be aligned with the laser light, and in this case, it is possible to reliably acquire an image of the welding section moving at high speed.

In the laser welding quality determination method and apparatus of the present invention, the high-speed camera starts acquiring an image of the welding section at the same time that welding is started by irradiating the metal plates with laser light from, for example, a $CO_2$ laser, and parameters such as the spatter count per unit length, the area of a high-luminance region and the keyhole detection frequency in the acquired image are sequentially analyzed. The analyzed parameters are compared with the respective comparison tables created beforehand, to determine the welding quality of the welding section, and information on the welding quality of the welding section determined on the basis of the individual parameters is displayed on the monitor.

That is, with the laser welding quality determination method and apparatus of the present invention, the welding quality of a welding section that cannot be visually checked can be determined while the welding operation is in progress. In addition, tensile shearing strength and fracture mode can be predicted on the basis of the defect occurrence rate and the amount of defects caused in the welding section.

Where the laser welding quality determination method and apparatus of the present invention are applied to welding of steel plates stacked one upon the other, the spatter count and the variance value of the area of a high-luminance region may be employed as analyzing parameters. In this case, the formation of pits due to an excessively small gap between the steel plates, proper welding, and the occurrence of burn-through due to an excessively large gap between the steel plates can be discriminated from one another.

Advantageous Effects of the Invention

With the laser welding quality determination method and apparatus of the present invention, the welding quality of a welding section can be determined while the welding operation is in progress, and it is therefore possible to provide a remarkable advantage that quality control matching high-speed, high-precision laser welding is available.

Also, with the laser welding quality determination method of the present invention, the formation of pits due to an excessively small gap between the steel plates, proper welding, and the occurrence of burn-through due to an excessively large gap between the steel plates can all be discriminated from one another, and it is therefore possible to provide a remarkable advantage that even higher-level quality control is available.

MODE OF CARRYING OUT THE INVENTION

The present invention will be described below with reference to the accompanying drawings.

It has been known that when metal plates, for example, zinc-coated steel plates stacked one upon the other, are welded together by using a laser, only the zinc coating of the zinc-coated steel plates is melted and pits are formed if the gap between the steel plates is too small or the laser output is low due to reduced transparency of the optical system. Also, it has been known that in the case of welding stacked zinc-coated steel plates to each other by using a laser, burn-through is caused due to shortage of the weld metal if the gap between the steel plates is too large, if the laser output is too high, or if the welding speed is slow.

The inventors hereof have acquired from long years of experience the knowledge that when pits, which are a defect in laser welding, are formed, the number of spatters is large, and when burn-through, which also is a welding defect, is caused, the variance value of the area of a high-luminance region is large. Also, the inventors are aware that when such welding defects occur, not only the parameters including the spatter count and the area of a high-luminance region change, but the detection frequency of keyholes lowers.

Thus, the inventors actually carried out a welding operation by radiating laser light from a laser head with a focal length of 1000 mm onto zinc-coated steel plates each with a thickness of 1.0 mm stacked one upon the other, to investigate the relationship between parameters, such as the amount of spatters, the variance value of the area of a high-luminance region and the keyhole detection frequency, and the occurrence rate of welding defects, such as the aforementioned pits and burn-through.

Further, the inventors similarly performed the welding operation on zinc- coated steel plates each with a thickness of 0.7 mm and zinc-coated steel plates each with a thickness of 2.0 mm, to examine the relationship between the amount of spatters and the welding defect occurrence rate with respect to each stack of steel plates having different thicknesses.

Figure 9:
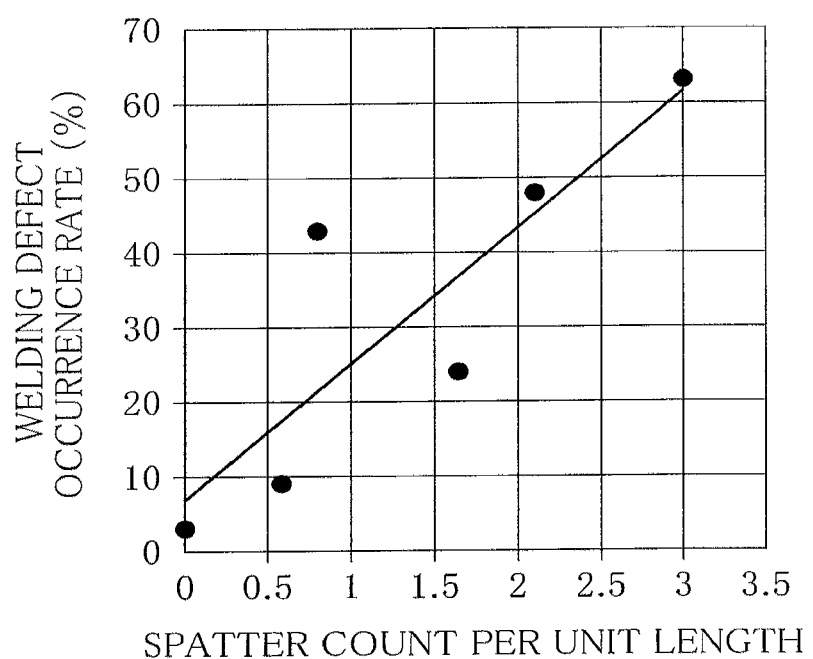
FIG. 9 is a graph showing the relationship between the rate of occurrence of welding defects and the spatter count observed when 1.0 mm-thick zinc-coated steel plates stacked one upon the other are welded together.
Figure 10:
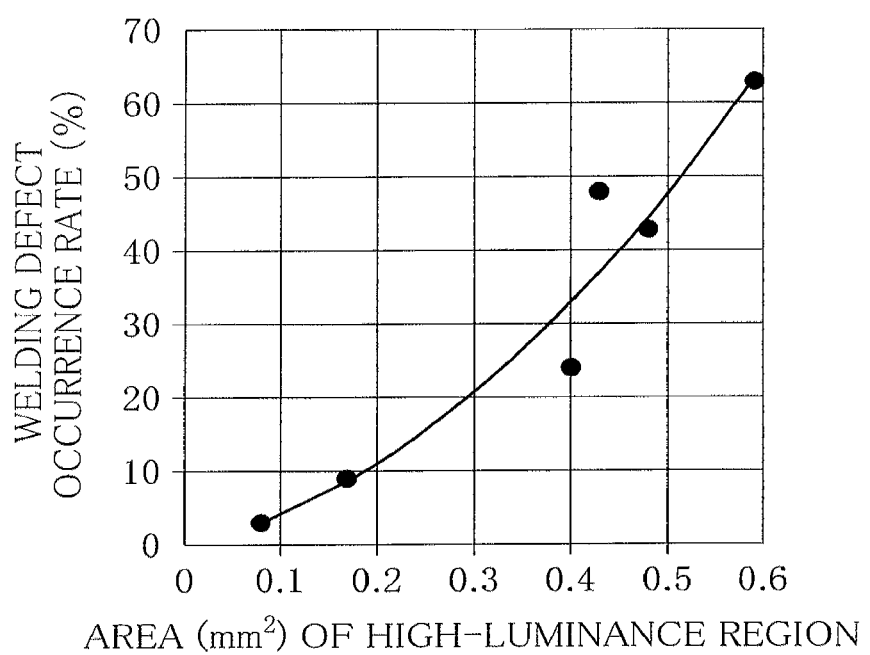
FIG. 10 is a graph showing the relationship between the welding defect occurrence rate and the variance value of the area of a high-luminance region observed when 1.0 mm-thick zinc-coated steel plates stacked one upon the other are welded together.
Figure 11:
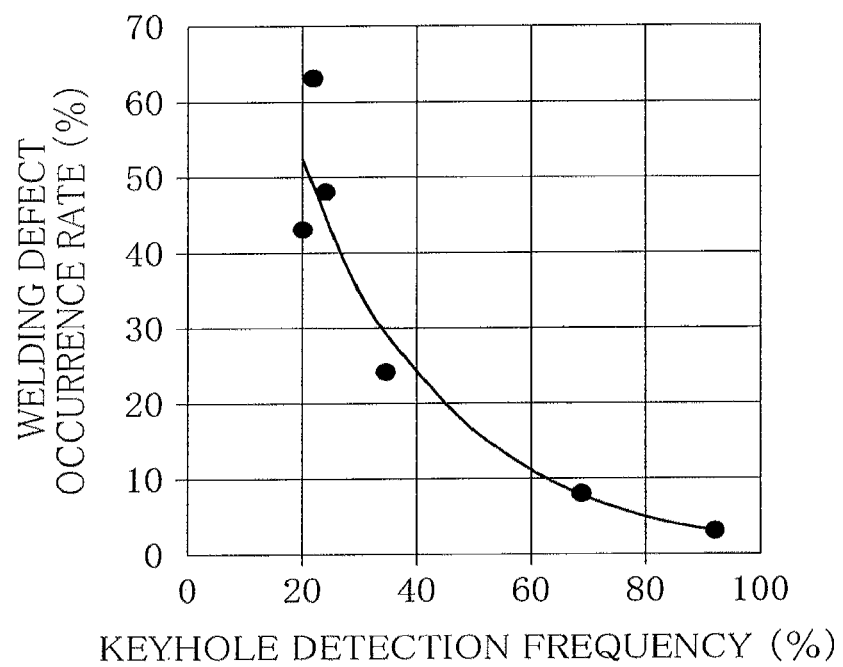
FIG. 11 is a graph showing the relationship between the welding defect occurrence rate and a detection frequency of keyholes observed when 1.0 mm-thick zinc-coated steel plates stacked one upon the other are welded together.
Figure 12:
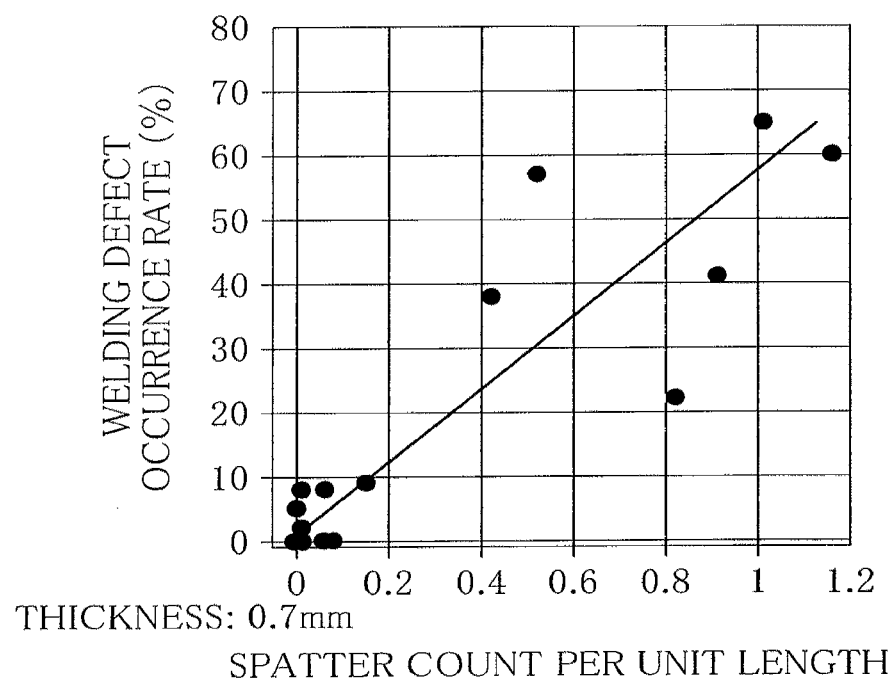
FIG. 12 is a graph showing the relationship between the welding defect occurrence rate and the spatter count observed when 0.7 mm-thick zinc-coated steel plates stacked one upon the other are welded together.
Figure 13:
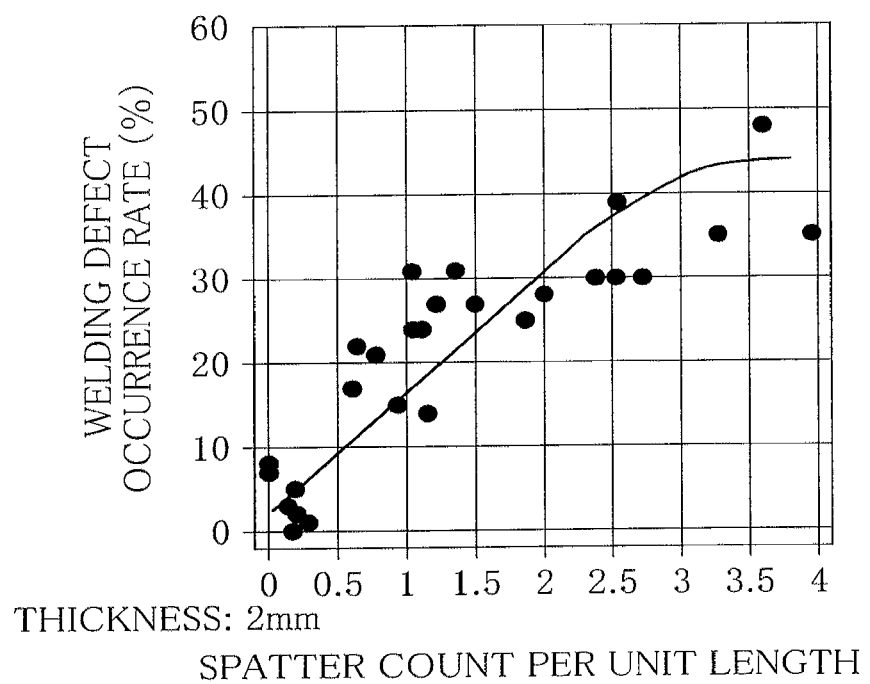
FIG. 13 is a graph showing the relationship between the welding defect occurrence rate and the spatter count observed when 2.0 mm-thick zinc-coated steel plates stacked one upon the other are welded together.

FIGS. 9 to 11 show the relationship between the parameters, namely, the amount of spatters, the variance value of the area of a high-luminance region and the keyhole detection frequency, and the occurrence rate of welding defects such as the aforementioned pits and burn-through, observed when the welding operation was performed on the 1.0 mm-thick zinc-coated steel plates stacked one upon the other. FIGS. 12 and 13 show the relationship between the amount of spatters and the welding defect occurrence rate, observed when the welding operation was performed on the 0.7 mm-thick zinc-coated steel plates and the 2.0 mm-thick zinc-coated steel plates, respectively.

From the results shown in FIGS. 9, 12 and 13, it could be confirmed that as the welding defect occurrence rate increases, the spatter count, or the number of spatters, per unit length tends to linearly increase irrespective of the thickness of the steel plates. Also, it could be confirmed from the result shown in FIG. 10 that as the welding defect occurrence rate increases, the variance value of the area of a high-luminance region tends to increase, and from the result shown in FIG. 11, it could be confirmed that as the welding defect occurrence rate increases, the detection frequency of keyholes tends to lower.

In this manner, the inventors verified that the occurrence rate of laser welding defects in a welding section could be predicted by analyzing the laser welding section with the use of the parameters such as the amount of spatters, the variance value of the area of a high-luminance region, and the keyhole detection frequency. After making further study, the inventors created the present invention.

FIGS. 1 through 7 illustrate a laser welding quality determination apparatus according to one embodiment of the present invention. The embodiment will be explained with reference to an exemplary case where the laser welding quality determination apparatus of the present invention is applied to laser welding of zinc-coated steel plates stacked one upon the other.

Figure 1:
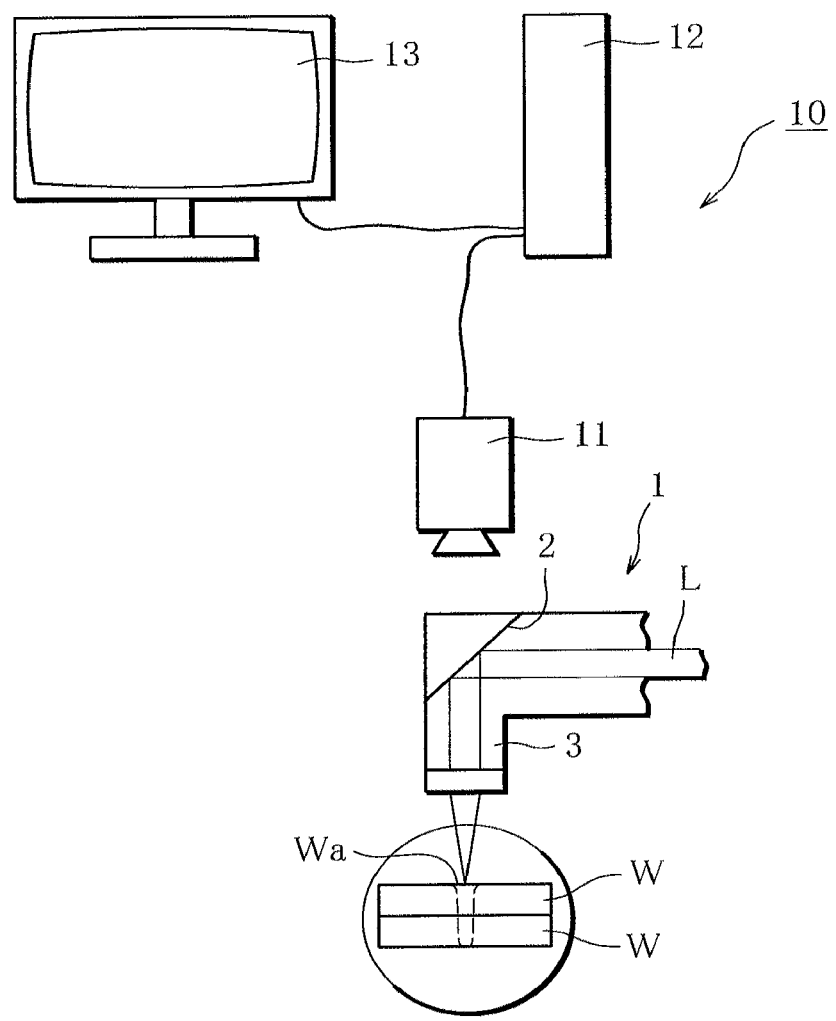
FIG. 1 illustrates the configuration of a laser welding quality determination apparatus according to one embodiment of the present invention.
Figure 2:
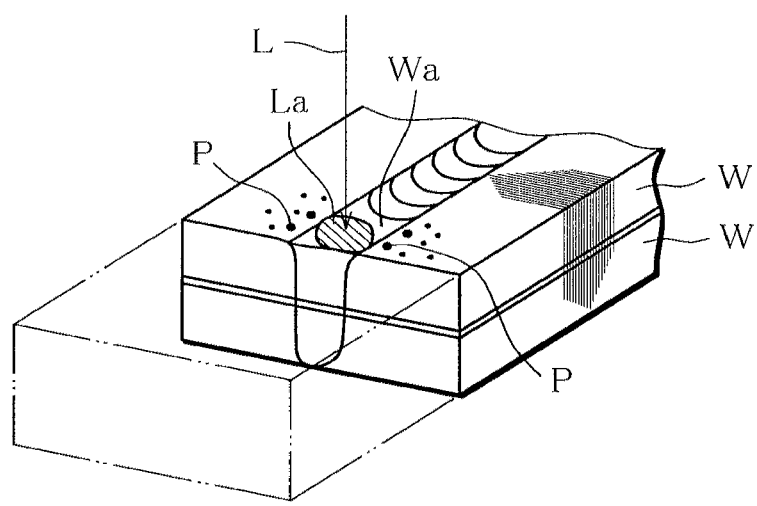
FIG. 2 is an enlarged perspective view of a part indicated by a circle in FIG. 1.

As illustrated in FIG. 1, a laser welding apparatus 1 for performing laser welding on zinc-coated steel plates W, W stacked one upon the other is provided with a half mirror 2 constituting an optical path of machining laser light L, and a light focusing unit 3. The light focusing unit 3 has a built-in light focusing lens for focusing the machining laser light L from the half mirror 2 so that the zinc-coated steel plate W may be irradiated with the machining laser light L with a suitable spot size.

The laser welding quality determination apparatus 10, which determines whether the quality of a welding section welded by the laser welding apparatus 1 is good or not, is equipped with a high-speed camera 11, an analyzer 12, and a monitor 13. The high-speed camera 11 is positioned such that an optical axis thereof is aligned with the machining laser light L, and acquires an image of the welding section Wa and its surrounding region. The analyzer 12 analyzes, as parameters, the number of spatters P (illustrated in FIG. 2), or a spatter count, per unit length and an area of a high-luminance region in the image acquired by the high-speed camera 11, and compares the analyzed parameters with respective comparison tables prepared beforehand to determine whether the welding quality of the welding section Wa is good or poor. The monitor 13 displays information on the welding quality of the welding section Wa determined by the analyzer 12.

If the spatter count P per unit length exceeds a reference value indicated by the comparison table prepared beforehand, the analyzer 12 judges that pits (welding defect) are formed because the gap between the zinc-coated steel plates W, W is too small. On the other hand, if a variance value of the area of a high-luminance region is greater than a reference value indicated by the comparison table prepared beforehand, the analyzer 12 judges that burn-through (welding defect) is caused because the gap between the zinc-coated steel plates W, W is too large. If the spatter count P per unit length and the variance value of the area of the high-luminance region are both smaller than or equal to the respective reference values indicated by the corresponding comparison tables, the analyzer 12 judges that the welding quality is good.

The operation of the laser welding quality determination apparatus 10 configured as described above will be now described. When a laser oscillator, not shown, of the laser welding apparatus 1 is started, the machining laser light L produced by the laser oscillator is propagated along the optical path to the light focusing unit 3 via the half mirror 2.

The machining laser light L thus propagated is concentrated to a suitable size by the light focusing lens built into the light focusing unit 3 and is radiated onto the zinc-coated steel plate W. Simultaneously with this, a table, not shown, on which the zinc-coated steel plates W are placed, is moved in a horizontal direction, so that the welding section Wa of the zinc-coated steel plates W moves.

Figure 3:
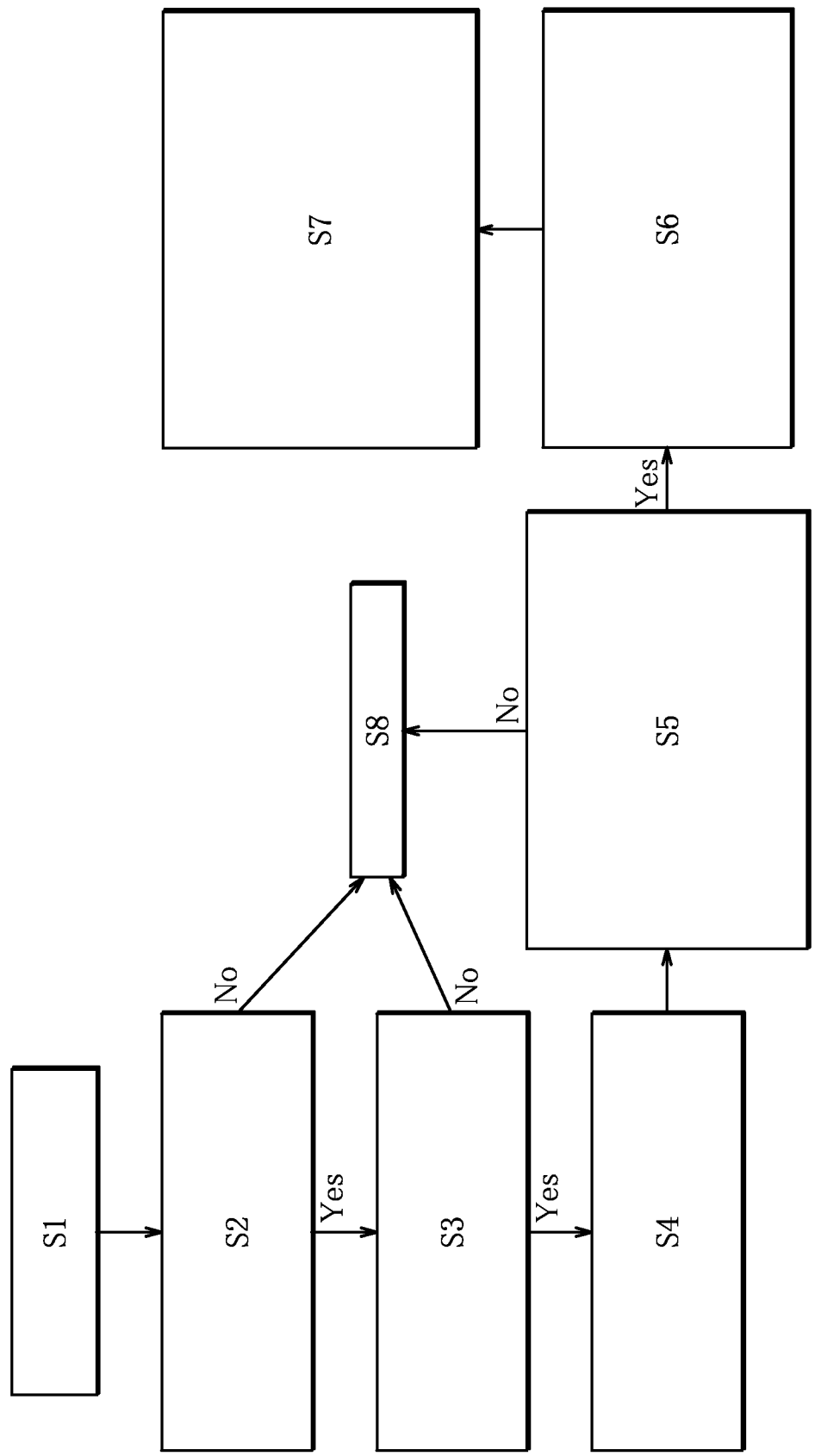
FIG. 3 is a flowchart illustrating detailed welding quality determination performed by the laser welding quality determination apparatus of FIG. 1 by using a spatter count as an analyzing parameter.

When the welding by the laser welding apparatus 1 is thus started, the high-speed camera 11 having its optical axis aligned with the machining laser light L starts acquiring an image of the welding section Wa. First, as illustrated in FIG. 3, a visualized image is input to the analyzer 12 in Step S1. Then, in Step S2, the analyzer 12 obtains a difference in contrast between the images of two consecutive frames, and if the contrast difference is greater than or equal to a preset threshold, the process proceeds to Step S3. If it is judged in Step S3 that the area of pixels (picture elements) showing a contrast difference greater than or equal to the threshold is larger than or equal to 0.2 mm$^2$, the flow proceeds to Step S4, where the identified area is defined as an object (moving object) and the gravity center of the object is calculated.

Figure 4:
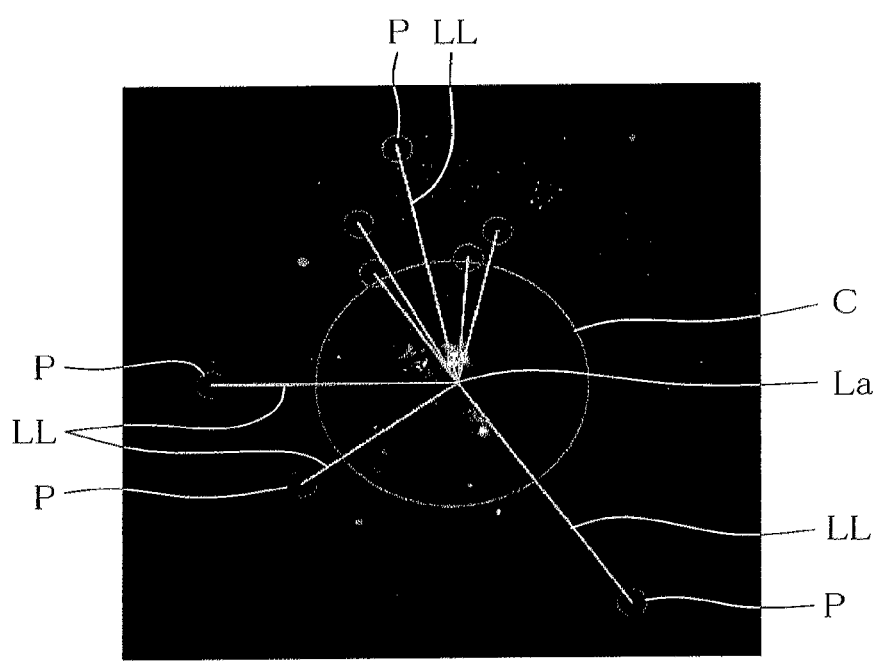
FIG. 4 is a photograph showing an example of how the spatter count is analyzed according to the flowchart of the detailed welding quality determination illustrated in FIG. 3.

Subsequently, in Step S5, the analyzer 12 determines whether or not the moving object scatters radially from a laser irradiation point La in the welding section Wa, as illustrated in FIG. 4, and lies on a radially extending straight line LL a number of times greater than or equal to a set number. If the moving object scatters radially and lies on the radial straight line LL the set number of times or more, the moving object is counted as a spatter P in Step S6.

After being counted as a spatter, the moving object may possibly remain within an analysis range (in FIG. 4, indicated by a circle C of which the center coincides with the laser irradiation point La). In order to prevent the moving object thus remaining within the analysis range from being counted again, any moving object lying on the same straight line LL and located farther from the laser irradiation point La than the counting point where the moving object was counted is not counted and is disregarded, in Step S6.

If it is judged in Step S7 that a moving object exists (or has been newly generated) which lies on the same straight line LL, on which the moving object has already been counted as a spatter P, but is located nearer to the laser irradiation point La than the counting point, the analyzer 12 again starts the counting of spatters P.

The analyzer 12 concludes in Step S8 that the moving object is not a spatter P, if it is judged in Step S2 that the contrast difference between the images of two consecutive frames is smaller than the preset threshold, if it is judged in Step S3 that the area of the pixels showing a contrast difference greater than or equal to the threshold is smaller than 0.2 mm$^2$, or if it is judged in Step S5 that the moving object does not scatter radially from the laser irradiation point La or does not lie on a radially extending straight line LL the set number of times.

In this manner, the spatter count P per unit length in the acquired image is sequentially analyzed by the analyzer 12, and if the derived spatter count P per unit length eventually becomes greater than the reference value indicated by the comparison table prepared beforehand, it is judged that pits (welding defect) are formed due to an excessively small gap between the zinc-coated steel plates W, W. On the other hand, if the spatter count P per unit length remains smaller than the reference value, it is judged that the welding quality is good. In either case, information on the determined welding quality of the welding section Wa is displayed on the monitor 13.

Figure 5:
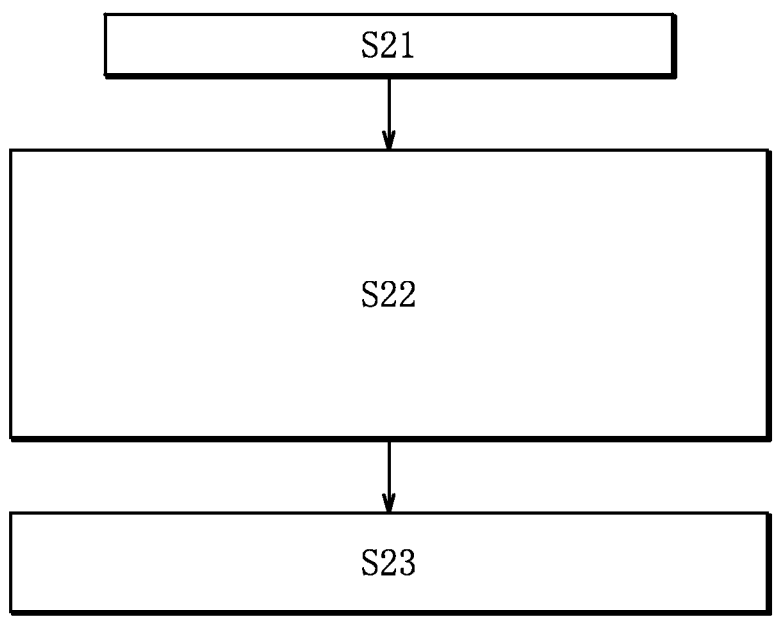
FIG. 5 is a flowchart illustrating welding quality determination performed by the laser welding quality determination apparatus of FIG. 1 by using the variance value of the area of a high-luminance region as an analyzing parameter.
Figure 7:
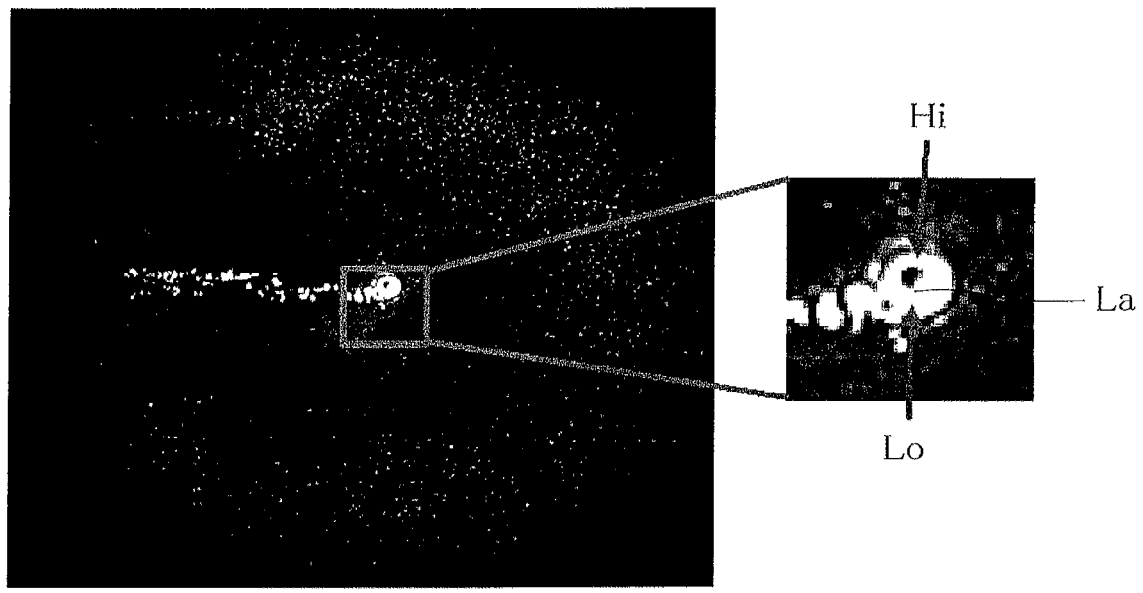
FIG. 7 is a photograph showing an example of how analysis is performed according to the flowcharts of FIGS. 5 and 6.

As soon as the high-speed camera 11 starts acquiring an image of the welding section Wa, the visualized image is input to the analyzer 12 in Step S21 of FIG. 5 illustrating the flowchart of welding quality determination using the variance value of the area of a high-luminance region as an analyzing parameter. Subsequently, in Step S22, the analyzer 12 counts the number of pixels in a region Hi which has a luminance value of "230" or more and which is situated inside a circle having a diameter of 30 pixels and a center coinciding with the laser irradiation point La, as illustrated in FIG. 7, and then in Step S23, the number of such pixels is counted with respect to each frame and is successively written to a text file. The upper limit of the luminance value is represented by 8-bit information ("256").

Thus, the variance value of the area of a high-luminance region in the acquired image is also sequentially analyzed by the analyzer 12, and if the derived variance value of the area of the high-luminance region eventually becomes greater than the reference value indicated by the comparison table prepared beforehand, it is judged that burn-through (welding defect) is caused due to an excessively large gap between the zinc-coated steel plates W, W. If, on the other hand, the variance value of the area of the high-luminance region remains smaller than the reference value indicated by the comparison table, it is judged that the welding quality is good. In either case, information about the determined welding quality of the welding section Wa is displayed on the monitor 13.

In this manner, the welding quality of the welding section Wa that cannot be visually checked, namely, the formation of pits due to an excessively small gap between the zinc-coated steel plates W, W, proper welding, and the occurrence of burn-through due to an excessively large gap between the zinc-coated steel plates W, W, can all be discriminated from one another while the laser welding operation is performed. In addition, tensile shearing strength and fracture mode can be predicted on the basis of the rate of occurrence of defects in the welding section and the amount of defects caused in the welding section.

Figure 6:
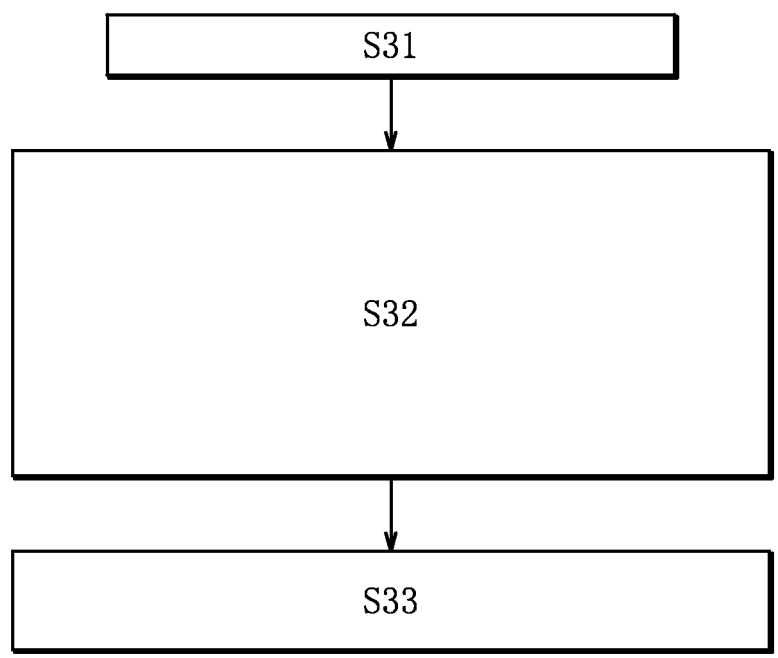
FIG. 6 is a flowchart illustrating welding quality determination performed by the laser welding quality determination apparatus of FIG. 1 by using a keyhole detection frequency as an analyzing parameter.

Furthermore, in this embodiment, the detection frequency of keyholes is also employed as an analyzing parameter. As soon as the high-speed camera 11 starts acquiring an image of the welding section Wa, the visualized image is input to the analyzer 12 in Step S31 of FIG. 6 illustrating the flowchart of welding quality determination using the keyhole detection frequency. Subsequently, in Step S32, it is determined whether or not there is a region Lo which has a luminance value of "100" or less and which is situated inside a circle having a diameter of 10 pixels and a center coinciding with the laser irradiation point La, as illustrated in FIG. 7. If there is a region having a luminance value of "100" or less, "1" is output; if there is no such region, "0" is output. Then, in Step S33, the presence or absence of the region Lo having a luminance value of "100" or less is checked with respect to each frame, and the result is successively written to a text file.

In this manner, the keyhole detection frequency observed during the welding is also analyzed by the analyzer 12 on the basis of the pixels showing the acquired image. If the keyhole detection frequency is higher than or equal to a reference frequency set beforehand, the welding quality is judged to be good, and if the keyhole detection frequency is lower than the reference frequency, the welding quality is judged to be poor. Information about the determined quality is displayed on the monitor 13.

Figure 8:
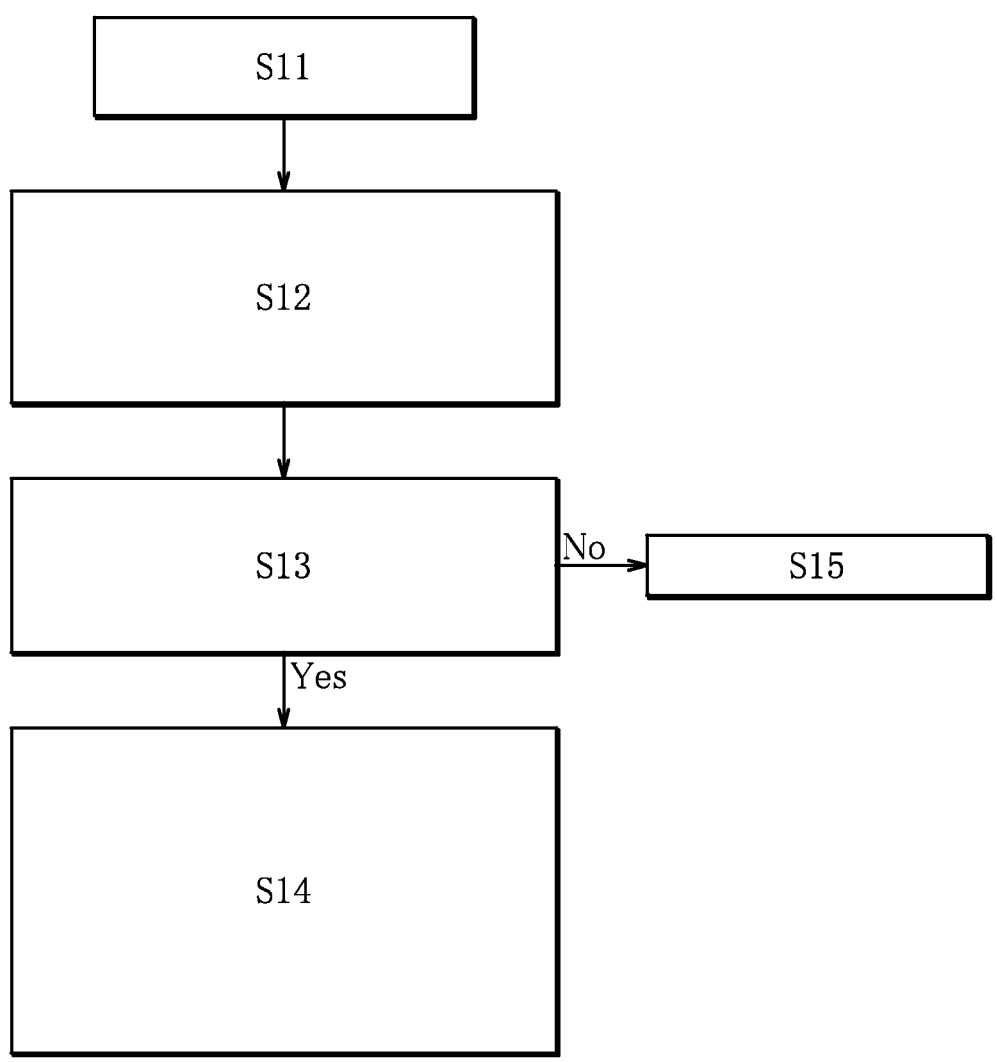
FIG. 8 is a flowchart illustrating simplified welding quality determination performed by the laser welding quality determination apparatus of FIG. 1 by using the spatter count as an analyzing parameter.

In the foregoing, detailed analysis of the visualized image input to the analyzer 12 has been described. Relatively simple analysis may be performed instead, as illustrated in FIG. 8.

In Step S11, the visualized image is input to the analyzer 12. Then, in Step S12, the analyzer 12 detects pixels which have luminance higher than or equal to a threshold and which are situated within a specified analysis range.

If it is judged in Step S13 that an area of the pixels having luminance higher than or equal to the threshold is greater than or equal to 0.2 mm$^2$, the number of spatters P within the still image is counted, the counting of spatters is carried out with respect to specified images, and a sum total of the spatter counts P is divided by the number of the images analyzed to obtain an average spatter count, in Step S14.

On the other hand, if it is judged in Step S13 that the area of the pixels having luminance higher than or equal to the threshold is smaller than 0.2 mm$^2$, it is concluded in Step S15 that the detected object is not a spatter P.

In this manner, the average spatter count is calculated by the analyzer 12 on the basis of the multiple images during the welding operation. If the average spatter count is smaller than or equal to a reference value indicated by a comparison table prepared beforehand, the welding quality is judged to be good, and if the average spatter count is greater than the reference value, the welding quality is judged to be poor. In either case, information on the determined welding quality is displayed on the monitor 13.

Also, with the simplified analysis, the welding quality of the welding section Wa that cannot be visually checked can be determined while the welding operation is in progress. In addition, the tensile shearing strength and the fracture mode can be predicted on the basis of the defect occurrence rate and the amount of defects caused in the welding section.

Where the laser welding quality determination apparatus of the present invention is applied to the laser stack welding of zinc-coated steel plates as in the aforementioned embodiment, the amount of fume generated when the zinc coating is melted may be employed as a parameter.

In the foregoing embodiment, the laser welding quality determination method and apparatus of the present invention are applied to ordinary laser welding. The present invention can also be applied to laser remote welding wherein a laser using an optical system such as a galvanometer mirror and having a long focal length is moved at high speed, or laser arc hybrid welding.

Also, in the above embodiment, the high-speed camera 11 is positioned such that the optical axis thereof is aligned with the machining laser light L. The positioning of the high-speed camera 11 is not limited to that illustrated in the embodiment and the high-speed camera 11 may be directed obliquely to the welding section to acquire an image of the welding section.

Further, in the foregoing embodiment, the present invention is applied to the laser welding of zinc-coated steel plates stacked one upon the other. Alternatively, the present invention may be applied to laser welding of other materials, for example, SUS or SN400 plates stacked one upon the other.

The laser welding quality determination method and apparatus of the present invention are not limited to the constructions described with reference to the embodiment.

EXPLANATION OF REFERENCE SIGNS

10: laser welding quality determination apparatus
11: high-speed camera
12: analyzer
13: monitor
L: machining laser light
P: spatter
W: zinc-coated steel plate
Wa: welding section

The invention claimed is:

1. A laser welding quality determination method for determining welding quality of a welding section welded by laser welding, comprising:
  acquiring an image of the welding section and a region surrounding the welding section by using a high-speed camera;
  analyzing a spatter count per unit length on a straight line radially extending from a laser irradiation point, an area of a high-luminance region and a keyhole detection frequency in the acquired image as parameters;
  determining welding quality of the welding section by comparing the analyzed parameters with a comparison table created beforehand; and
  displaying a result of the welding quality determination on a monitor.

2. The laser welding quality determination method according to claim 1, wherein:
  the method is applied to determination of laser welding quality of a welding section of steel plates stacked one upon another,
  the spatter count per unit length and the area of the high-luminance region in the acquired image are analyzed as parameters,
  if the spatter count per unit length is greater than a reference value indicated by a comparison table created beforehand, it is judged that pits are formed due to an excessively small gap between the steel plates, if a variance value of the area of the high-luminance region is greater than a reference value indicated by a comparison table created beforehand, it is judged that burn-through is caused due to an excessively large gap between the steel plates,
  the laser welding quality is judged to be good if the spatter count per unit length and the variance value of the area of the high-luminance region are both smaller than or equal to the respective reference values indicated by the corresponding comparison tables, and a result of the welding quality determination is displayed on the monitor.

3. The laser welding quality determination method according to claim 2, wherein:
- if the keyhole detection frequency is higher than or equal to a reference frequency indicated by a comparison table created beforehand, it is judged that the welding quality is good with respect to that parameter,
- if the keyhole detection frequency is lower than the reference frequency indicated by the comparison table, it is judged that the welding quality is poor, and
- a result of the welding quality determination is displayed on the monitor.

4. The laser welding quality determination method according to claim 2, wherein:
- the method is applied to determination of laser welding quality of a welding section of zinc-coated steel plates stacked one upon another,
- an amount of fume in the acquired image is analyzed as a parameter,
- if the amount of fume is smaller than or equal to a reference value indicated by a comparison table created beforehand, it is judged that the welding quality is good with respect to that parameter,
- if the amount of fume is larger than the reference value indicated by the comparison table, it is judged that the welding quality is poor, and
- a result of the welding quality determination is displayed on the monitor.

* * * * *